United States Patent Office 3,288,194
Patented Nov. 29, 1966

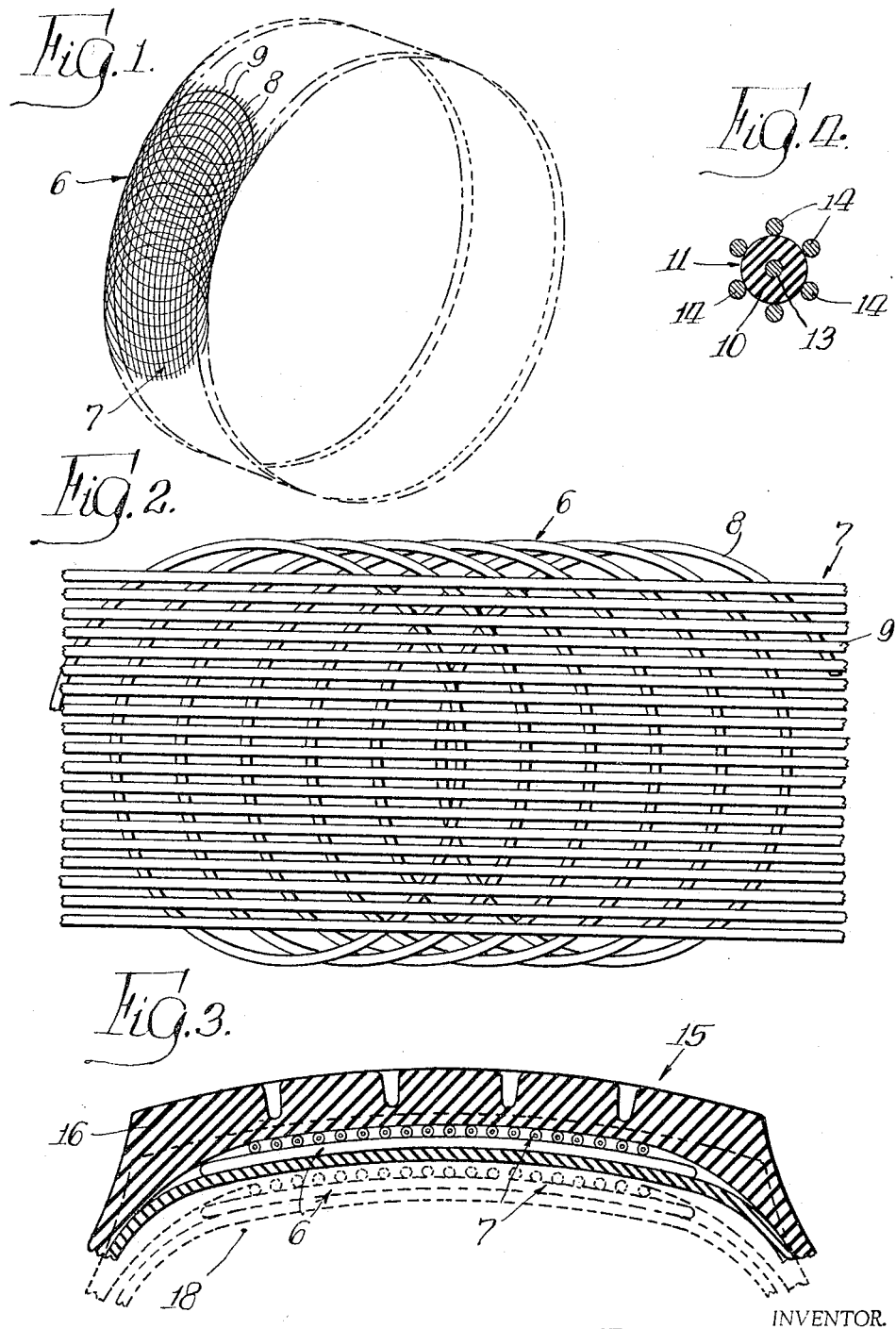

3,288,194
RESTRICTIVE TREAD PLY COMPONENTS
FOR PNEUMATIC TIRES
Larry C. Frazier, Prescott, Ariz., assignor to National-Standard Company, Niles, Mich., a corporation of Delaware
Filed Mar. 11, 1965, Ser. No. 438,947
5 Claims. (Cl. 152—361)

The present invention relates to improved restrictive tread ply components for pneumatic tires.

Restrictive tread ply components, sometimes referred to in the art as cincture structures or inextensible plies, comprise rubber coated strands of fiber or metal and are incorporated in a tire between the crown of the tire carcass and tread. Such restrictive tread components are variously designed to restrict radial and circumferential growth of the tire carcass and to provide desired road engaging characteristics of the tire tread. Tread ply components known in the tire art are inherently substantially inextensible in their uncured and cured states and as a consequence are difficult to properly orient in a tire in the molding of the tire in a tire mold, and do not effectually accomplish their intended purposes.

It is an object of the present invention to provide a trend ply component overcoming the aforementioned disadvantages by reason of its being relatively extensible and inextensible before and after curing in the tire, respectively, so that the tread ply component before curing of a tire in the tire mold permits the tire to expand in the tire mold and after curing serves to restrict carcass growth and provide food road traction characteristics for the tread, and, in addition, enables disposition of the tread ply component to effectively accomplish its intended functions.

In order to achieve the aforesaid object in accordance with the principles of the present invention there is provided a restrictive tread component formed by a first annular ply having first cord means lying in a plurality of circumferentially successive and overlapping convolutions, and a second ply having second cord means of generally helical configuration with the axis thereof co-axial with the axis of the first annular ply and with the turns of the second ply in superposed relation with the convolutions of the first ply.

According to the invention the cord means for the aforementioned first annular ply may be substantially inextensible but in which the convolutions are displaceable relative to each other for a desired disposition in the tire, or, if desired, such cord means may be relatively extensible and inextensible, respectively, in the uncured and cured states of a tire in which the ply is incorporated.

A preferred feature of the present invention is to provide second cord means for the aforementioned second ply characterized by being relatively extensive and inextensible, respectively, in the cured and uncured states of a tire in which the ply is incorporated.

A further preferred feature resides in providing cord means for either or both the aforementioned plies comprising a rubber core and a plurality of strands spirally wound around the core, and in which such cord means in the uncured and cured states of the rubber core is of relatively high and low elongation, respectively.

The above and other advantages, objects and features of the invention will be apparent from the following detailed description of a preferred embodiment of the invention.

Now in order to acquaint those skilled in the art with the principles of the present invention, there is described below in connection with the accompanying drawings a preferred embodiment of the invention.

In the drawings:

FIGURE 1 is a diagrammatic view of the restrictive tread component of the present invention;

FIGURE 2 is an enlarged developed view of a portion of the tread component of FIGURE 1;

FIGURE 3 is a cross-section of a portion of a typical pneumatic tire showing, in dotted lines, the tread component of the invention prior to curing of the tire, and in full lines the tread component of the invention in the cured tire; and FIGURE 4 is a vertical sectional view of cord means suitable for use in one of the plies of the tread component of the invention.

Referring now to FIGURE 1, the restrictive tread component of the invention as there shown comprises a first or inner annular ply 6 and a second or outer helical ply indicated generally at 7. The inner ply 6 as best seen in FIGURE 2 is defined by cord means 8 arranged to lie in a plurality of circumferentially successive and serially connected overlapping convolutions over the entire circumference of the ply. The cord means 8 is preferably formed from a single continuous length of cord reinforcing material and of appropriate length to form a ply of desired diameter for the tread component of a tire. The reinforcing cord 8 may be fabricated of any desired natural or synthetic fibers or materials, such as cotton, nylon, rayon and fiber glass or metals, or combinations of such fibers and metals and may comprise mono-filament or multi-filament strands twisted or stranded together and, if desired, such strands may also, in turn, be reinforced. The reinforcing cord 8 may be rubber coated or not, as desired, and if not coated may be embedded in a rubber sheet or layed between a pair of rubber sheets. In forming the inner annular ply 6 it is preferable that the opposed ends thereof be disposed in mating or nested relation so that the circular convolutions are disposed in substantially uniform overlapping relation with respect to each other over the entire circumference of the ply and with their being but two ends of the cord material namely at the start and finishing the formation of the convolutions. Also, it will be understood that the convolutions of the inner ply 6 need not be circular but other configurations may be employed such as diamond, triangular, or tear drop.

The outer or second ply 7 comprises cord means 9 wound into helically configuration and is arranged with the axis thereof coaxial with the axis of the first or inner annular ply 6 so that the turns of the cord means 9 extend circumferentially outwardly of and in superposed relation with the convolutions of the inner or first annular ply 6. The cord means 9 of the ply 7 is constructed so as to be of relatively high and low elongation, respectively, in the uncured and cured states of the tire in which the restricted tread component ply is incorporated. The aforementioned cord means 8 may be substantially inextensible but may, if desired be of relatively high and low elongation like cord means 9. A suitable construction of cord means 11 for this purpose is disclosed in detail in United States Patent No. 3,133,584 dated May 19, 1964, to E. U. Lang and assigned to the assignee of the present application, and to which patent reference may be had. However, briefly, and as shown in FIGURE 4, the cord means 11 may, for example, comprise a rubber core 10 of high modulus stock reinforced by a central filament or wire 13. The stock 10 preferably has a high sulfur and clay filler content so that before curing it is easily extrudable and not extrudable after curing. As disclosed in the aforementioned patent, the reinforcing wire 13 is of low tensile strength and high elongation properties with it serving also to provide for the laying of a plurality of strands 14 spirally around the core 10 as by passing through a conventional closer. The strands 14 may each be a monofilament or may comprise multifilament spirally wound strands of steel or other suitable materials of good tensile strength. Cord means 11 thus constructed is characterized by being of relatively high and low elongation, respectively, in the uncured and cured states of the rubber core 10 all as is explained in detail in the aforementioned United States Patent. The cord means 11 may additionally be rubber coated, if desired, and the inner or first annular ply 6 in which the cord means 8 and the cord means 9 of the second or outer ply 7 composed of such cord means 11 may be assembled with one or between a pair of rubber sheets to form a laminated structure.

A tread ply component of the invention as above described and as shown in FIGURE 3 may be incorporated in a tire 15 between the tread 16 thereof and the crown portion of a carcass 18 of any desired construction. With these several components assembled initially in a tire mold for forming the tire the tread ply component of the invention is disposed in the position indicated in dotted lines. Upon expansion of the assembly in a tire mold and curing of the same, the cord means 8 of circular convolutions of the first or inner annular ply 6 whether characterized by being substantially inextensible or by being of relatively high and low elongation such as at 11 may displace relative to each other, and the cord means 9 of the outer ply 7 being of relatively high and low elongation may elongate in a circumferential direction whereby the whole tread component ply is displaceable for snug assembly with the carcass and tread of the tire. By reason of the aforedescribed characteristic of the cord means 9 of the second or outer ply upon curing of the rubber core thereof and in curing of the tire renders such cord means 9 relatively inextensible to thus provide a finished tire in which the restrictive tread component effectively restricts carcass growth and provides for support of the tread in desired road engaging relation. So also if relatively high and low elongation cord means 11 is employed on the cord means 8 in the inner annular ply it too is rendered relatively inextensible upon curing.

It will be obvious that the lay of the convolutions of the first or inner annular ply 6 and the number of turns of cord in the outer ply 7 may be varied with the two plies being disposed relative to each other to provide various characteristics that may be desired for restricting carcass expansion and road tread engagement.

While there has been shown and described a preferred embodiment of the invention, it will be understood that various modifications and rearrangements may be made therein without departing from the spirit and scope of the invention.

The invention claimed is:

1. In a restrictive tread component for a tire the combination of a first annular ply comprising first cord means lying in a plurality of circumferentially successive and serially connected convolutions, each of said convolutions being in overlapping relation with more than one of serially successive convolutions, and a second ply comprising second cord means of helical configuration having its axis coaxial with the axis of said first annular ply and with the turns of said second cord means in superposed relation with the convolutions of said first annular ply.

2. In a restrictive tread component for a tire the combination of a first annular ply comprising first cord means lying in a plurality of circumferentially successive and serially connected convolutions, each of said convolutions being in overlapping relation with more than one of serially successive convolutions, and a second ply comprising second cord means of helical configuration having its axis coaxial with the axis of said first annular ply and with the turns of said second cord means in superposed relation with convolutions of said first annular ply and said second cord means in the uncured and cured states of said tire being of relatively high and low elongation, respectively.

3. In a restrictive tread component for a tire the combination of a first annular ply comprising first cord means lying in a plurality of circumferentially successive and serially connected convolutions, each of said convolutions being in overlapping relation with more than one of serially successive convolutions, and a second ply comprising second cord means of helical configuration having its axis coaxial with the axis of said first annular ply and with the turns of said second cord means extending circumferentially of and in superposed relation with the convolutions of said first annular ply, said cord means for said plies each comprising a rubber core and a plurality of strands spirally wound around said core, and each of said cord means being characterized in the uncured and cured states of said rubber core by being of relatively high and low elongation, respectively.

4. In a restrictive tread component for a tire the combination of a first inner annular ply comprising first substantially inextensible cord means lying in a plurality of circumferentially successive and serially connected circular convolutions, each of said convolutions being in overlapping relation with more than one of serially successive convolutions, and a second outer ply comprising second cord means of helical configuration having its axis coaxial with the axis of said first annular ply and with the turns of said second cord means lying circumferentially outwardly of and in superposed relation with the circular convolutions of said first annular ply, said second cord means comprising a rubber core and a plurality of steel strands spirally wound around said core, and said second cord means being characterized in the uncured and cured states of said rubber core by being of relatively high and low elongation, respectively.

5. In a restrictive tread component for a tire the combination of a first inner annular ply comprising first rubber coated cord means lying in a plurality of circumferentially successive and serially connected circular convolutions, each of said convolutions being in overlapping relation with more than one of serially successive convolutions, and a second outer ply comprising second cord means of helical configuration having its axis coaxial with the axis of said first annular ply and with the turns of said second cord means lying circumferentially outwardly of and in superposed relation with the circular convolutions of said first annular ply, said second cord means comprising a rubber core and a plurality of steel strands spirally wound around said core, and said second cord means being characterized in the uncured and cured states of said rubber core by being of relatively high and low elongation, respectively.

References Cited by the Examiner

UNITED STATES PATENTS

| 636,536 | 11/1899 | Liais | 152—205 |
|---|---|---|---|
| 3,105,785 | 10/1963 | Kocher | 152—205 X |
| 3,133,584 | 5/1964 | Lang | 152—359 |

FOREIGN PATENTS 1,140,534   3/1957   France.

ARTHUR L. LA POINT, *Primary Examiner.*

C. W. HAEFELE, *Assistant Examiner.*